United States Patent
Hayashi

(10) Patent No.: US 6,301,520 B1
(45) Date of Patent: Oct. 9, 2001

(54) SPINDLE END POSITIONAL DEVIATION CORRECTION SYSTEM FOR MACHINE TOOLS

(75) Inventor: Hideki Hayashi, Susono (JP)

(73) Assignee: Toshiba Kikai Kabushiki Kaisha, Kawasaki (JP)

( * ) Notice: Subject to any disclaimer, the term of this patent is extended or adjusted under 35 U.S.C. 154(b) by 0 days.

(21) Appl. No.: 09/034,345

(22) Filed: Mar. 4, 1998

(30) Foreign Application Priority Data

Mar. 5, 1997 (JP) .................................................... 9-050667

(51) Int. Cl.$^7$ ...................................................... G06F 19/00
(52) U.S. Cl. .............................. 700/193; 700/192; 700/57
(58) Field of Search ..................... 700/192, 193, 700/194, 57; 318/561; 702/97

(56) References Cited

U.S. PATENT DOCUMENTS

| | | | |
|---|---|---|---|
| 3,640,632 | * 2/1972 | Schuman | 408/11 |
| 4,195,250 | * 3/1980 | Yamamoto | 318/561 |
| 4,514,814 | * 4/1985 | Evans | 700/157 |
| 4,775,926 | * 10/1988 | Hasewaga | 700/57 |
| 4,976,177 | * 12/1990 | Fouche | 82/147 |
| 5,007,006 | * 4/1991 | Taylor | 702/97 |
| 5,019,763 | * 5/1991 | Komatsu | 318/571 |
| 5,214,592 | * 5/1993 | Serizawa et al. | 700/193 |
| 5,216,308 | * 6/1993 | Meeks | 310/90.5 |
| 5,250,865 | * 10/1993 | Meeks | 310/90.5 |
| 5,315,197 | * 5/1994 | Meeks et al. | 310/90.5 |
| 5,329,457 | * 7/1994 | Hemmerle | 700/193 |
| 5,396,434 | * 3/1995 | Oyama | 700/193 |
| 5,514,924 | * 5/1996 | McMullen et al. | 310/90.5 |
| 5,525,848 | * 6/1996 | Pinkerton et al. | 310/90 |
| 5,543,673 | * 8/1996 | Katsumata et al. | 310/90.5 |
| 5,581,467 | * 12/1996 | Yasuda | 700/193 |
| 5,713,253 | * 2/1998 | Date et al. | 82/1.11 |
| 5,739,607 | * 4/1998 | Wood, III | 310/90.5 |
| 5,740,081 | * 4/1998 | Suzuki | 702/308 |
| 5,779,405 | * 7/1998 | Aiso | 409/132 |
| 5,804,900 | * 9/1998 | Taniguchi et al. | 310/90.5 |

\* cited by examiner

Primary Examiner—William Grant
Assistant Examiner—Ronald D Hartman, Jr.
(74) Attorney, Agent, or Firm—Finnegan, Henderson, Farabow, Garrett & Dunner, L.L.P.

(57) ABSTRACT

A spindle is formed with a radial flange in a vicinity of a front end thereof, a spindle feed shaft rotatably holding the spindle has a non-contact type deviation detector secured thereto in opposite to a surface of the flange in an axial direction of the spindle, the deviation detector detects a deviation of an air gap in the axial direction between therefrom to the flange surface, a correction value of an axial position of the spindle is calculated in accordance with the detected deviation of the air gap, and a command responsible for tile axial position of the spindle is corrected in accordance with the calculated correction value to compensate for an axial position of the front end of the spindle.

10 Claims, 3 Drawing Sheets

SPINDLE END POSITIONAL DEVIATION CORRECTION SYSTEM FOR MACHINE TOOLS

BACKGROUND OF THE INVENTION

1. Field of the Invention

The present invention relates to a spindle end positional deviation correction system for machine tools, and particularly, it relates to a spindle end positional deviation correction System for compensating a deviation in axial position (Z-axis position) of a tool at a spindle, due such as to a thermal deformation of the spindle, in a machine tool of a numerical control type.

2. Description of Relevant Art

The machine tool generally has its spindle thermally deformed due to heat generation such as at bearings of the spindle as well as a spindle motor, during a long processing operation. In the numerical control machine tool, such a thermal deformation causes a coordinate position relationship between a spindle and a work table to be deviated in a Z-axis direction, resulting in a reduced processing accuracy. The coordinate position relationship between spindle and work table is caused to deviate in Z-axis direction, also by deflections of the spindle and bearings supporting the spindle, due to reaction forces of cutting actions, as well as by a contraction of the spindle due to a centrifugal force of the spindle in rotation, resulting in a reduced processing accuracy.

There have been made attempts over many years to compensate for the reduced processing accuracy in Z-axis direction due to a deformed spindle. In an attempt, body temperatures (such as at a spindle holding ram) of a machine tool were measured by temperature sensors and processed to estimate a quantity of thermal deformation in an axial direction of a spindle, and a (Z-axis) command for a position in the axial direction of the spindle was corrected in dependence on the estimation, to thereby compensate for the thermal deformation quantity in a canceling manner.

As another conventional art relevant to the present invention, there has been disclosed in Japanese Utility Model Application Laid-Open Publication No. (Hei)1-92347 a thermal positional deviation correction device, in which a thermal positional deviation in a radial direction of a spindle was measured by a non-contact type gap sensor provided at a housing end, and a (X-axis) position in the radiation direction of the spindle was corrected in dependence on a measured value of the gap sensor.

In general, the quantity of thermal deformation in an axial direction of a spindle is estimable from machine body temperatures. However, such an estimated quantity does not always represent the quantity of an actual deformation. Therefore, the positional deviation correction in axial direction of spindle may unsuccessfully depend on body temperatures, failing to achieve a spindle end positional deviation correction with a high accuracy.

Further, due to relatively large heat-mass dependent time constants such as of a spindle and a ram, it is difficult to perform the spindle end positional deviation correction with high accuracy, sometimes on a real time basis, and it actually is impossible to do so with a required precision.

The positional correction in axial direction of a spindle, so far as it depends on a machine body temperature, is thus applicable simply to a correction of a positional deviation due to a thermal deformation, and unable to correct positional deviations in axial direction of the spindle due to other causes.

In this respect, the thermal positional deviation correction device disclosed in the Japanese Utility Model Application'Laid-Open Publication No. (Hei)1-92347 is for correction of a radial (X-axis) position of a spindle, but not for that of an axial (Z-axis) position off spindle.

SUMMARY OF THE INVENTION

The present invention has been achieved with such points in view.

It therefore is an object of the present invention to provide a spindle end positional deviation correction system for machine tools, permitting a correction with an improved precision, on a real time basis as necessary, with respect to a positional deviation in an axial direction of a spindle due to a thermal deformation of the spindle and other factors.

To achieve the object, a first aspect of the invention provides a spindle end positional deviation correction system for machine tools including a spindle and a spindle holding member for holding the spindle to be rotatable relative thereto, the system comprising: a flange element provided on the spindle in a vicinity of an end of the spindle; a deviation detector, secured to the spindle holding member in opposite to a surface of the flange element in an axial direction of the spindle, for detecting in a non-contact manner a deviation of a gap in the axial direction between the deviation detector and the surface of the flange element; calculation means for calculating a correction value of an axial position of the spindle in accordance with the deviation of the gap detected by the deviation detector; and correction means for correcting a command responsible for the axial position of the spindle in accordance with the correction value calculated by the calculation means to compensate for an axial position of the end of the spindle.

According to the first aspect of the invention, in a (current) process in which a spindle rotates relative to a spindle holding member, a non-contact type deviation detector secured to the spindle holding member detects a (local or mean) deviation of an axial gap between therefrom to a (radial or annular) surface of a flange element provided on the spindle in a vicinity of a (front) end of the spindle, as it represents an occasional variation of an axial positional relationship between the end of the spindle that may be contracted or elongated due to a thermal deformation and other dynamic factors and an associated (reference) position of the spindle holding member that is representative of an (inherent or otherwise determined) axial position of (an entirety or an associated portion of) the spindle to be controlled with a command responsible therefor, and a (Z-axis correction value) calculation means calculates a correction value of the axial position of the spindle (not for an inherent control or other determination, but for a compensation described below) in accordance with the deviation of the axial gap detected by the deviation detector. Then, in (a real time manner in) the (current) process or in a (subsequent) process, a correction means corrects the command in accordance with the correction value calculated by the calculation means to compensate for an axial position of the end of the spindle (so that a positional deviation of the end of the spindle relative to a desired distance therefrom to a work piece is canceled e.g. by axially displacing the spindle holding member together with the spindle or by axially displacing the spindle alone).

Accordingly, there is achieved an improved processing precision.

According to a second aspect of the invention, the calculation means comprises first means for calculating a mean value of the respective deviations of the gap detected by the deviation detector within a time interval, and second means for calculating the correction value of the axial position of the spindle in accordance with the mean value calculated by the first means.

According to the second aspect of the invention, the calculation means includes a means for calculating a mean value of the deviations of the axial gap each respectively detected by the deviation detector within a certain interval of time (in which the spindle turns by e.g. one or more revolutions), and calculates the command correction value of the axial position of the spindle.

Accordingly, there is achieved an effective correction value essentially free from an occasionl detection of a false deviation.

According to a third aspect of the invention, the spindle is supported by a set of beatings at a pair of support portions thereof spaced from each other in the axial direction, and the flange element comprises a flange integrally formed on the spindle, between the end of the spindle and one of the support portions of the spindle nearer thereto.

According to the third aspect of the invention, the spindle has a flange integrally formed thereon between the (front) end thereof and a nearer one of a pair of axially spaced support portions thereof.

Accordingly, there is permitted a precise positional deviation correction of the spindle end based on an ensued deviation detection.

BRIEF DESCRIPTION OF THE ACCOMPANYING DRAWINGS

The above and further objects and novel features of the present invention will mote fully appear from the following detailed description when the same is read in conjunction with the accompanying drawings in which.

Figure 2:
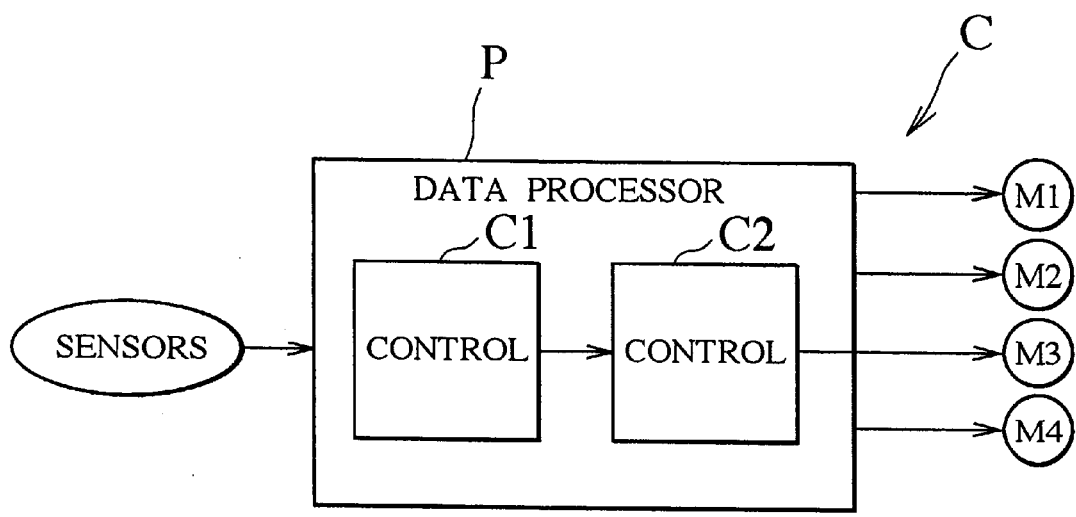
FIG. 2 is a block diagram of the control system of the machine tool of FIG. 1 including a spindle end positional deviation correction system according to an embodiment of the invention, in which a spindle is axially movable together with a feed shaft as a spindle holding member.
Figure 3:
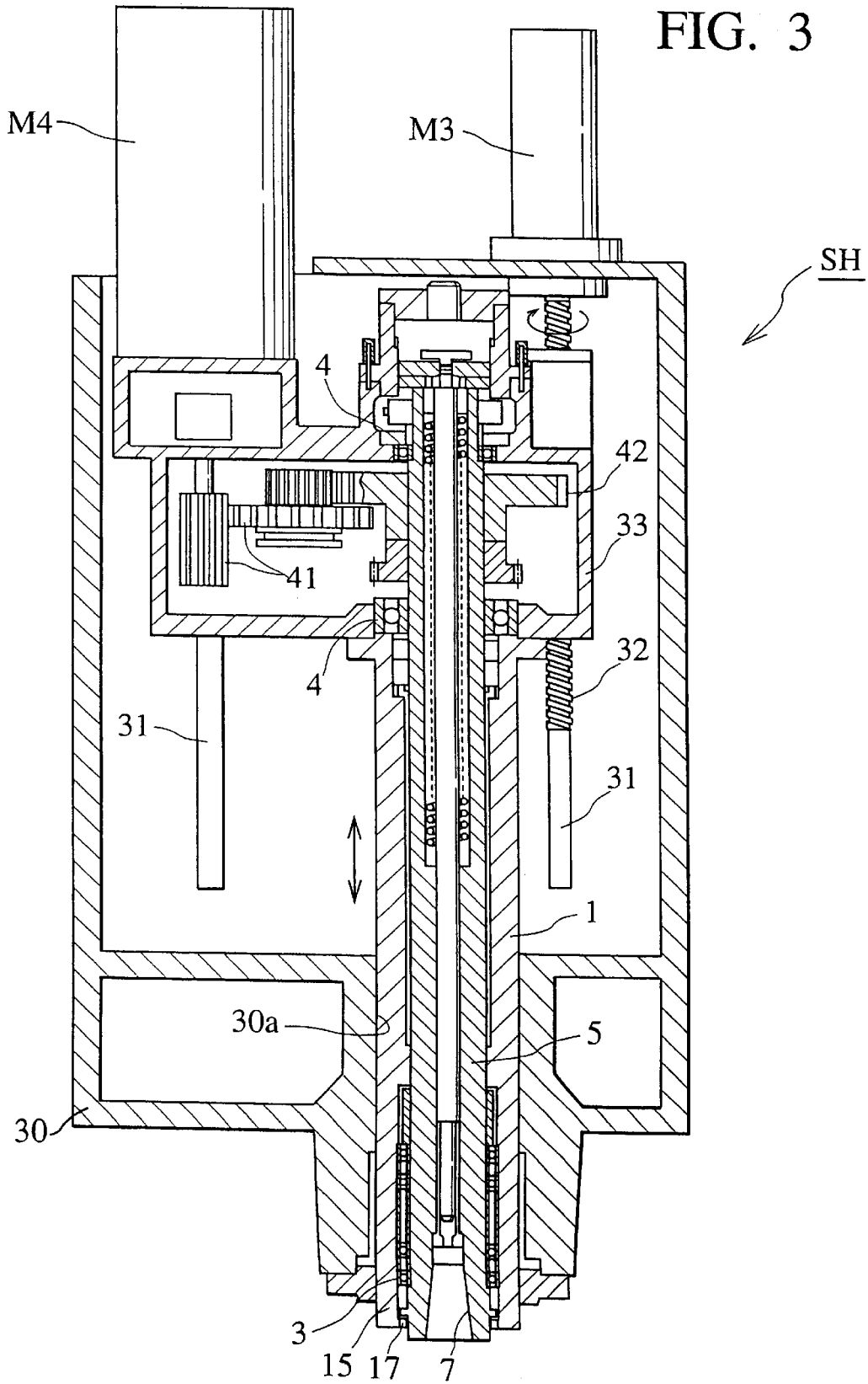
FIG. 3 is a longitudinal section of a spindle head of the machine tool of FIG. 1.
Figure 4:
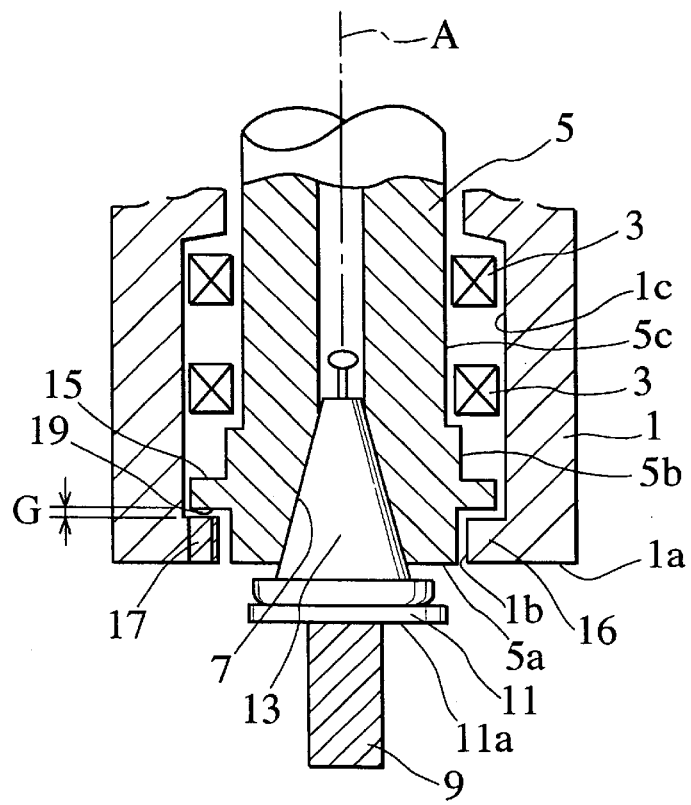
Figure 5:
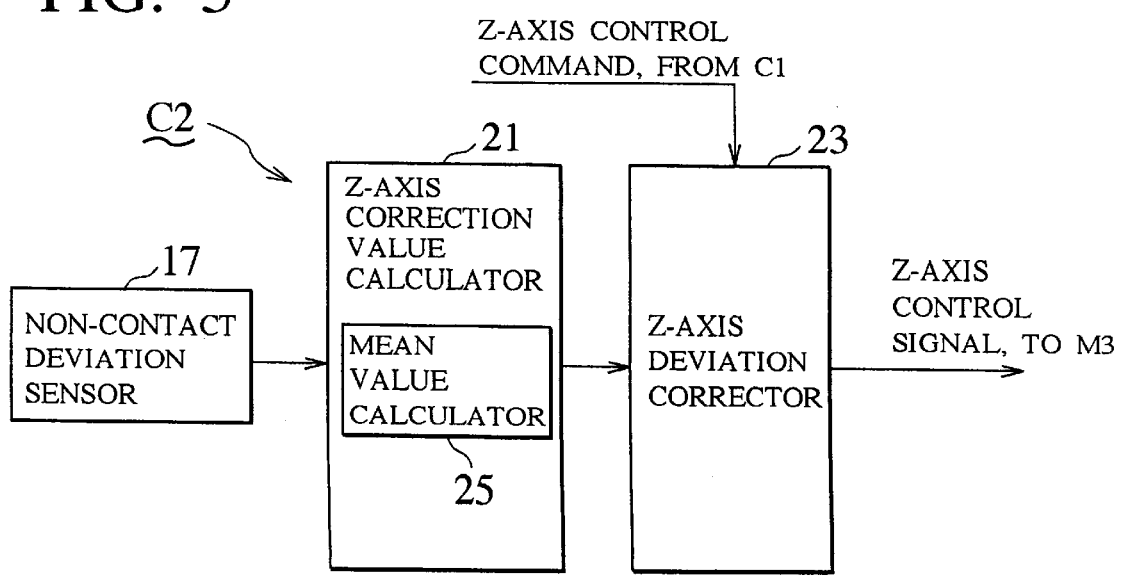

FIG. 4 shows a longitudinal section of a front end portion of the spindle head of FIG. 3, and that of a spindle head including a spindle and a spindle housing as a spindle holding member according to a modification of the embodiment, in which the spindle is axially movable relative to the spindle housing; and FIG. 5 is a block diagram of the spindle end positional deviation correction system involved in the control system of FIG. 2.

DETAILED DESCRIPTION OF THE PREFERRED EMBODIMENTS

There will be detailed below the preferred embodiments of the present invention with reference to the accompanying drawings. Like members are designated by like reference characters.

Figure 1:
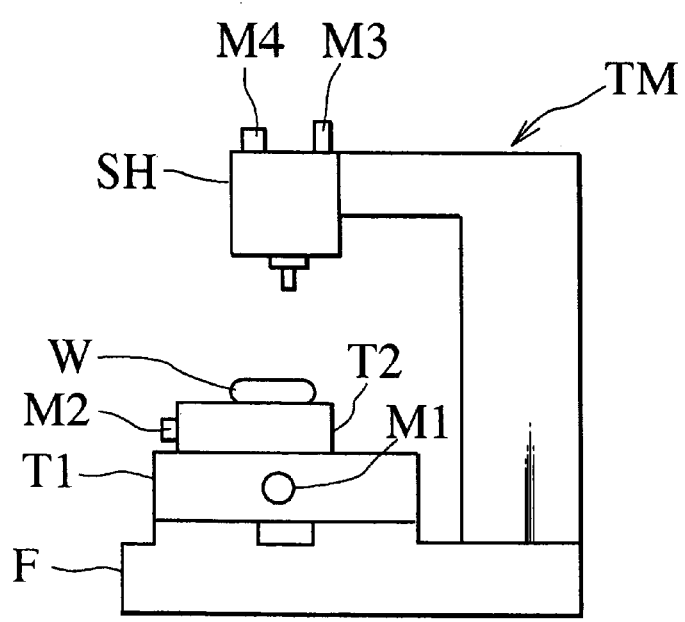
FIG. 1 is an elevation of a machine tool equipped with a control system.

FIGS. 1, 3 and 4 show a machine tool TM in which the invention is embodied, a spindle head SH of the machine tool TM, and a front end portion of the spindle head SH, respectively As shown in FIG. 1, the machine tool TM includes a machine frame F having a base section anchored to a foundation, a lower table T1 movable on the base section of the machine frame F in an X-axis direction, a first step motor M1 for driving the lower table T1, an upper table T2 movable on the lower table in a Y-axis direction, a second step motor M2 for driving the upper table T2, and the spindle head SH mounted on a column section of the machine frame F. A work piece W is set on the upper table T2.

As shown in FIG. 3, the spindle head SH includes a spindle head casing 30 fixed to the column section of the machine frame F, a gear box 33 movable relative to the spindle head casing 30 along a ball screw 32 formed in one of mutually parallel linear guide rails 31 extending in a Z-axis direction, a hollowed feed shaft 1 fixed at a rear end thereof to the gear box 33 and downwardly extending through a front guide hole 30a of the spindle head casing 30, a third step motor M3 for driving the ball screw 32 to feed the feed shaft 1, a spindle 5 fitted in the feed shaft 1 and supported to be rotatable relative thereto by virtue of a combination of a set of front bearings 3 installed between respective recessed cylindrical front end parts of the shaft 1 and the spindle 5 and a pair of upper and lower rear bearings 4 installed between a cylindrical rear part of the spindle 5 and associated wall parts of the gear box 33, a driven wheel 42 fixed on the spindle 5 between the upper and lower bearings 4, a gear train 41 engaged with the driven wheel 42, and a fourth step motor M4 for driving the gear train 41 to rotate the spindle 5. A thermocouple is fitted in the spindle 5.

As shown in FIG. 4, the front end portion of the spindle head SH includes the respective front end parts of the feed shaft 1 and the spindle 5, with the front bearings 3 installed therebetween. The spindle 5 is formed, at a front end 5a thereof, with a circular-cone-like tapered shank reception hole 7 for detachably receiving a likewise shaped shank 13 of a tool holder 11 with a tool 9 held to a downside 11a thereof. The tool holder 11 is clamped with an unshown tool clamp collet. The front end 5a of the spindle 5 is normally flush with a front end la of the feed shaft 1.

In a modification (readable on FIG. 4), the feed shaft 1 may be replaced by a spindle horsing 1, fixed to or axially slidable on a column section of a machine frame (F), as a spindle holding member (1) for rotatably holding a spindle (5) to be driven for axial displacement by a third step motor (M3).

The spindle 5 has an outer circumferential part 5b facing an inner circumferential part 1b of the feed shift 1. The outer circumferential part 5b of the spindle 5 has a radially outwardly protruding flange 15 integrally formed thereon, and a front bearing part 5c reduced in diameter. The flange 15 is nearer to the front end 5a of the spindle 5 than the bearing part 5c. The inner circumferential part 1b of the feed shaft 1 has a radially inwardly protruding rim 16 integrally formed thereon so as to oppose the flange 15 in the direction of a rotation axis A of the spindle 1 that extends in the Z-axis direction, and a front bearing part 1c enlarged in diameter. The front bearings 3 are installed in, a space defined between the bearing parts 1c, 5c of the shaft 1 and the spindle 5.

At a front end wall of the shaft 1, the rim 16 has a non-contact type positional deviation detector 17, installed therein: in opposite to a downside surface 19 of the flange 15 in, the axial direction, for measuring in a non-contact manner an instantaneous axial gap G (air gap in the embodiment between a sensing element of the detector 17 and the flange surface 19, with a high accuracy, while the spindle 5 is rotating. The flange surface 19 is normally spaced from the sensing element at a predetermined distance of few millimeters thereby defining the axial gap G.

The axial gap G may be equivalent to a distance between the flange surface 19 and an upside surface of the rim 16. The gap G may be measured in a vacuum, gas, oil or some chemical The non-contact measurement may be performed by use of ultrasonic waves, eddy currents, laser rays, monochromatic light, or variations of an electric capacity, electromagnetic field, etc. In a modification, the flange surface 19 may be polished or covered with a material or electrode selected and/or shaped for an enhanced reflection or concentration or for an improved electromagnetic effect.

The flange 15 may be a separate flange element fastened to the spindle 5, and may be voluntarily configured for a desired adaptation to provide a surface 19 cooperative with the sensing element of the detector 17. The rim 16 may also be a separate element fixed to the feed shaft 1, and may be voluntarily configured.

In modification in which the feed shaft 1 is replaced by a spindle housing, a spindle (5) may have like flange (15) and/or like thermocouple, the spindle housing may have like rim (16) with like detector (17) installed therein, and like bearings (3, 4) may be installed like in FIG., 4).

The axial gap G, as it is measured by the detector 17, represents a sum of the predetermined normal distance that may depend on a local position of the flange surface 19 and a deviation thereof, that is, a precise positional deviation of the front end 5a (or a tool fixing end) of the spindle 5 relative to a controlled distance therefrom to the upper table T2 or a surface of the work piece W thereon. In this respect, the deviation detector 17 if adapted to detect an instantaneous deviation of the normal axial gap G.

In the modification in which the feed shaft 1 is replaced by a spindle housing, a deviation detector (17) may detect a deviation in axial position of a front end (5a) of a spindle (5) relative to a controlled axial position of an entirety of the spindle (5).

FIG. 2 shows a control system C of the machine tool TM of a numerical control type, and FIG. 5, a spindle end positional deviation correction system involved in the control system C.

The control system C comprises a set of sensors including the positional deviation detector 17 and the thermocouple in the spindle 5, a data processor P for processing detection data from the set of sensors as well as instructions from an operator of the machine tool TM to control the first to fourth step motors M1 to M4 in a synchronized manner. The data processor P has necessary control programs installed therein, including a fundamental control program for processing a set of specified work data to provide an original command responsible for a Z-axis coordinate of the feed shaft 1, a first correction program C1 for processing detection data from the thermocouple to correct the original command to provide a first corrected command responsible for a Z-axis coordinate of the feed shaft 1 in consideration of a working temperature of the spindle 5, as necessary, and a second correction program Hd for processing detection data from the deviation detector 17 to correct a selective one of the original command and the first corrected command to provide a second corrected command responsible for a Z-axis coordinate of the feed shaft 1 in consideration of an axial deformation of the spindle 5.

When the first corrected command is selected to be corrected at the program Hd, the data from the deviation detector 17 represent a positional deviation due to a dynamic deformation of the spindle 5. If the original command is selected, it simply passes through (or jumps over) the program C1 to the program Hd, and the data from the deviation detector 17 represent a positional deviation due to a thermal deformation and the dynamic deformation.

The modification in which the feed shaft 1 is replaced by a spindle housing may have like control system (C).

As shown in FIG. 5, the spindle end positional deviation correction control system comprises the non-contact type positional deviation sensor 17 cooperating with the flange 15 to detect a positional deviation, and the second correction program Hd cooperating with the data processor P as well as with the first correction program C1 therein to control the third step motor M3.

The second correction program Hd has a first set of program files as a Z-axis correction value calculator 21 and a second set of program files as a Z-axis deviation corrector 23.

The Z-axis correction value calculator 21 receives from the detector 17 a set of detection data on instantaneous magnitudes of the axial gap G, and calculates a correction value of an axial position of the spindle 5 in dependence on the received detection data by executing arithmetic operations on a set given expressions. This calculation may be substituted with one of other applicable measures such as by reading data on a stored table to find an estimated deviation of the spindle end 5a corresponding to a measured or Calculated axial gap G.

The Z-axis correction value calculator 21 includes a mean value calculator 25 for calculating a mean value of instantaneous magnitudes of the axial gap G (or of a deviation thereof) measured (or detected) during every occurrence of a predetermined or calculated time interval that may correspond to one or more revolutions of the spindle 5. The correction value of the axial position of the spindle 5 is computed from the mean value of the instantaneous magnitudes of the axial gap G, as it is calculated by the mean value calculator 25.

Therefore, the correction value of the axial position of the spindle 5 is properly determined even if the surface 19 of the flange 15 had occasionally failed to be completely perpendicular to the rotation axis A of the spindle 5.

The Z-axis deviation corrector 23 receives the selected one of the original command and the first corrected command, as a Z-axis control command (from the first program C1 in terms of a system element), and the correction value calculated by the Z-axis correction value calculator 21, and corrects the Z-axis control command of the spindle 5 by the received correction value to provide the second corrected command, which is output as a Z-axis control signal from the data processor P to the third step motor M3, thereby affecting a compensation for a positional deviation of an axial position of the front end 5a of the spindle 5 due to a thermal deformation, a dynamic deformation and any other deformation in the axial direction of the spindle 5. As a result, the positional deviation at the spindle end 5a is canceled.

The spindle end positional deviation correction may be performed on a real time basis with high accuracy, permitting an extremely precise processing.

While preferred embodiments of the present invention have been described using specific terms, such description is for illustrative purposes, and it is to be understood that changes and variations may be made without departing from the spirit or scope of the following claims.

What is claimed is:

1. A spindle end positional deviation correction system for machine tools including a spindle and a spindle holding member for holding the spindle to be rotatable relative thereto, the system comprising:

a flange element provided on the spindle in a vicinity of an end of the spindle;

a deviation detector, secured to the spindle holding member in opposite to a surface of the flange element in an axial direction of the spindle, for detecting in a non-contact manner a deviation of a gap in the axial direction between the deviation detector and the surface of the flange element;

calculation means for calculating a correction value of an axial position of the spindle in accordance with the deviation of the gap detected by the deviation detector; and correction means for correcting a command responsible for the axial position of the spindle in accordance with the correction value calculated by the calculation means to compensate for an axial position of the end of the spindle.

2. A spindle end positional deviation correction system for machine tools according to claim 1, wherein the calculation means comprises:

first means for calculating a mean value of the respective deviations of the gap detected by the deviation detector within a time interval; and second means for calculating the correction value of the axial position of the spindle in accordance with the mean value calculated by the first means.

3. A spindle end positional deviation correction system for machine tools according to claim, 1 or 2, wherein the spindle is supported by a set of bearings at a pair of support portions thereof spaced from each other in the axial direction, and wherein the flange element comprises a flange integrally formed on the spindle, between the end of the spindle and one of the support portions of the spindle nearer thereto.

4. A spindle end positional deviation correction system for machine tools, comprising:

a spindle having a radial surface;

a spindle holding member for holding the spindle relative to the machine tool;

a detector attached to the spindle holding member to sense of deviation of a gap in an axial direction between the detector and the radial surface of the spindle;

a control element for determining a correction value of an axial position of the spindle based at least in part on the gap deviation detected by the detector; and a mechanism for changing the axial position of the spindle based at least in part on the correction value determined by the control element.

5. A positional deviation correction system according to claim 4, wherein at least a portion of the radial surface of the spindle has a polished surface to enhance a reflection of a beam of light originating from the detector.

6. A positional deviation correction system according to claim 4, wherein the detector is detachably connected to the spindle holding member such that at least a portion of the detector directly faces at least a portion of the radial surface of the spindle to form an angle of 180 degrees therebetween.

7. A positional deviation correction system according to claim 4, wherein the spindle is arranged in an axial position relative to the machine tool.

8. A positional deviation correction system according to claim 4, wherein the control element includes a plurality of detectors for obtaining data, a data processor for processing the data obtained by the plurality of detectors, and an input from a human operator.

9. A positional deviation correction system according to claim 8, wherein the plurality of detectors includes the detector attached to the spindle holding member and a thermocouple attached to the spindle.

10. A positional deviation correction system according to claim 9, wherein the data processor includes a program for processing information to provide an original command responsible for determining a spatial location of an axial coordinate of the spindle holding member, a first correction program for processing the data obtained from the thermocouple, and a second correction program for processing the data obtained from the detector attached to the spindle holding member.

* * * * *